United States Patent [19]

Wu

[11] Patent Number: 5,784,924
[45] Date of Patent: Jul. 28, 1998

[54] GEARSHIFT ADJUSTING DEVICE

[76] Inventor: Mu-Chuan Wu, No. 462-7, Chung Shan Road, Hsi Kang Hsiang, Tainan Hsien, Taiwan

[21] Appl. No.: 823,503

[22] Filed: Mar. 25, 1997

[51] Int. Cl.⁶ .................. B62K 23/04; B62M 25/04
[52] U.S. Cl. ............... 74/473.13; 74/489; 74/142; 74/473.28
[58] Field of Search ............ 74/473.13, 473.14, 74/489, 142, 473.28, 502.2, 506, 577 R, 577 S, 577 M

[56] References Cited

U.S. PATENT DOCUMENTS

| | | | |
|---|---|---|---|
| 4,474,339 | 10/1984 | Sato | 74/577 S X |
| 5,134,897 | 8/1992 | Romano | 74/489 |
| 5,481,934 | 1/1996 | Tagawa | 74/489 X |
| 5,524,501 | 6/1996 | Patterson et al. | 74/489 X |
| 5,615,580 | 4/1997 | Chen et al. | 74/473.13 |
| 5,660,083 | 8/1997 | Huang et al. | 74/473.13 X |

FOREIGN PATENT DOCUMENTS 216373  7/1961  Austria ............ 74/489

*Primary Examiner*—Rodney H. Bonck
*Assistant Examiner*—Scott Lund
*Attorney, Agent, or Firm*—Pro-Techtor International Services

[57] ABSTRACT

A gearshift adjusting device has a first hollow sleeve, a second hollow sleeve coupling with the first hollow sleeve, and a retaining ring disposed in an upper portion of the first hollow sleeve. The first hollow sleeve has an inner pipe and a hollow disk seat disposed on the inner pipe. The second hollow sleeve has an outer pipe and an annular ring disposed on the outer pipe. The inner pipe is inserted in the outer pipe. The hollow disk seat encloses the annular ring. The first hollow sleeve is connected to a handle of an exercise bike.

3 Claims, 7 Drawing Sheets

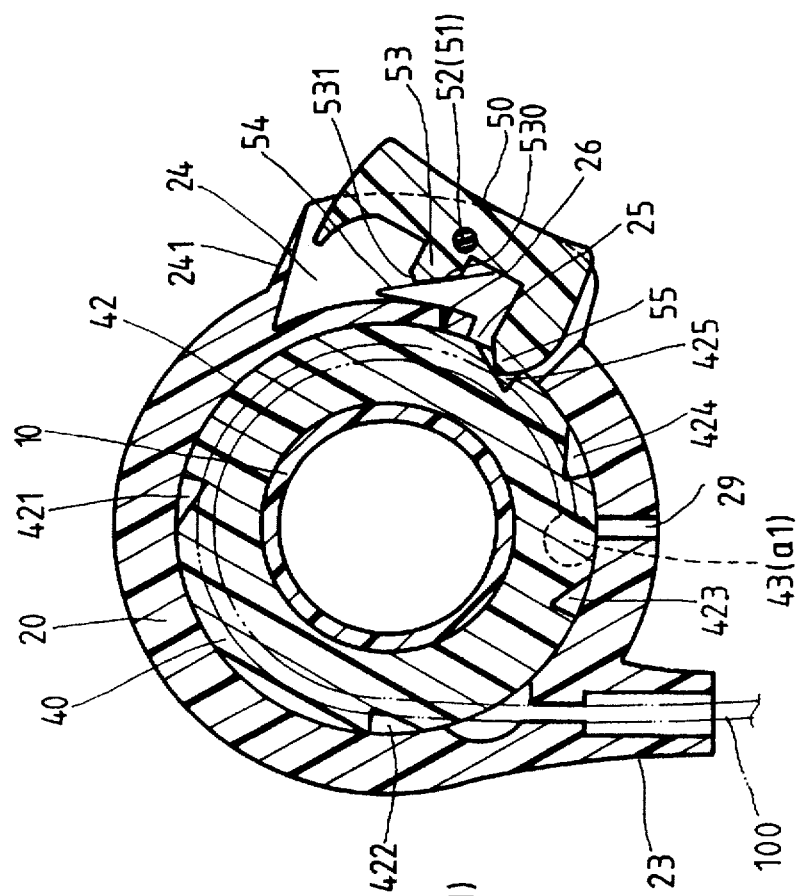
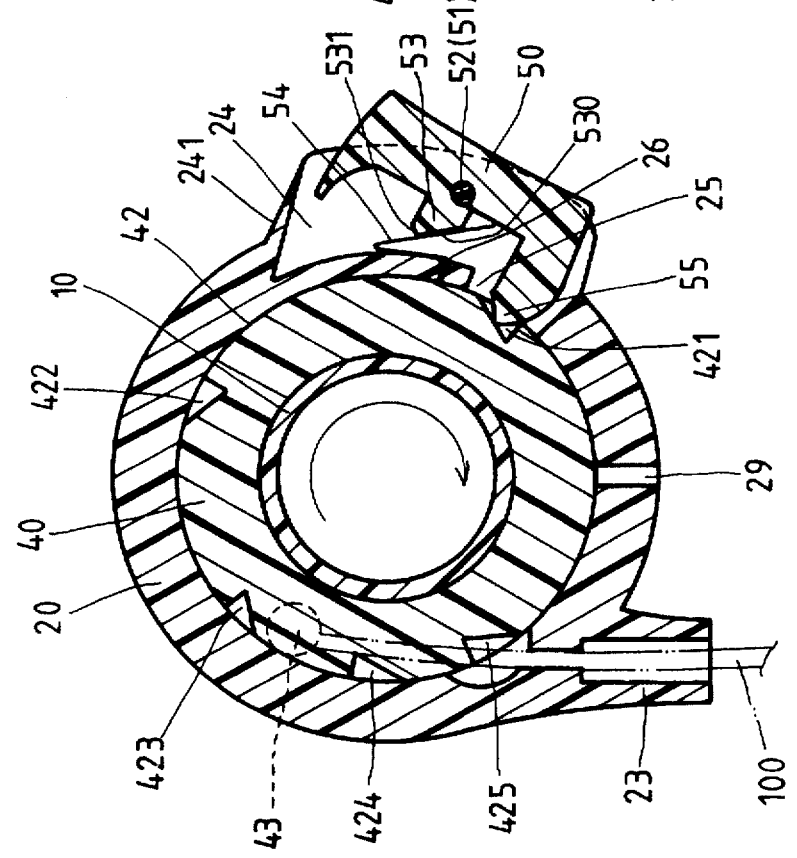

5,784,924

GEARSHIFT ADJUSTING DEVICE

BACKGROUND OF THE INVENTION

The invention relates to a gearshift adjusting device. More particularly, the invention relates to a gearshift adjusting device for an exercise bike.

A conventional gearshift adjusting device for an exercise bike should be adjusted slowly. The user cannot adjust the conventional gearshift adjusting device from a first speed to a third speed directly. The user has to adjust the conventional gearshift adjusting device from the first speed to the second speed and then from the second speed to the third speed in order.

SUMMARY OF THE INVENTION

An object of the invention is to provide a gearshift adjusting device for an exercise bike which can be easily returned to an original speed from any other speed.

Accordingly, a gearshift adjusting device comprises a first hollow sleeve, a second hollow sleeve coupling with the first hollow sleeve, and a retaining ring disposed in an upper portion of the first hollow sleeve. The retaining ring has a center hole, a slot, a first round hole, a second round hole, and a positioning bar. The first hollow sleeve has an inner pipe and a hollow disk seat disposed on the inner pipe. The hollow disk seat has an opening to receive the retaining ring, a positioning recess on an inner periphery of the hollow disk seat, a cage groove on the inner periphery of the hollow disk seat, a threaded hole on the hollow disk seat, a water outlet on the hollow disk seat, a tube disposed on the hollow disk seat, and a hollow positioning plate disposed on the hollow disk seat. The hollow positioning plate has a separating plate and a through hole. A cage seat is inserted in the hollow positioning plate. A U-shaped elastic plate is disposed between the cage seat and the hollow positioning plate. The cage seat has an inserted hole, a cage block, and two arms. The cage block has a first bevel and a second bevel. A pin passes through the through hole and the inserted hole to fasten the cage seat and the hollow positioning plate together. A notch and an inserted groove are formed on the hollow disk seat. The inserted groove receives a portion of the U-shaped elastic plate. The second hollow sleeve has an outer pipe and an annular ring disposed on the outer pipe. A plurality of protruded bars are disposed on an outer periphery of the outer pipe. An outer casing encloses the outer pipe. The annular ring has a periphery groove, a ratchet wheel, a cage recess, and a protruded block. The ratchet wheel has a plurality of ratchets. The cage recess communicates with the periphery groove. A cable has an end inserted in the cage recess. The cable passes through the periphery groove and the tube. The inner pipe is inserted in the outer pipe. The hollow disk seat encloses the annular ring. The protruded block is inserted in the cage groove.

BRIEF DESCRIPTION OF THE DRAWINGS

FIGS. 7 to 11 are sectional views illustrating operations of a gearshift adjusting device of a preferred embodiment in accordance with the invention.

DETAILED DESCRIPTION OF THE INVENTION

Figure 1:
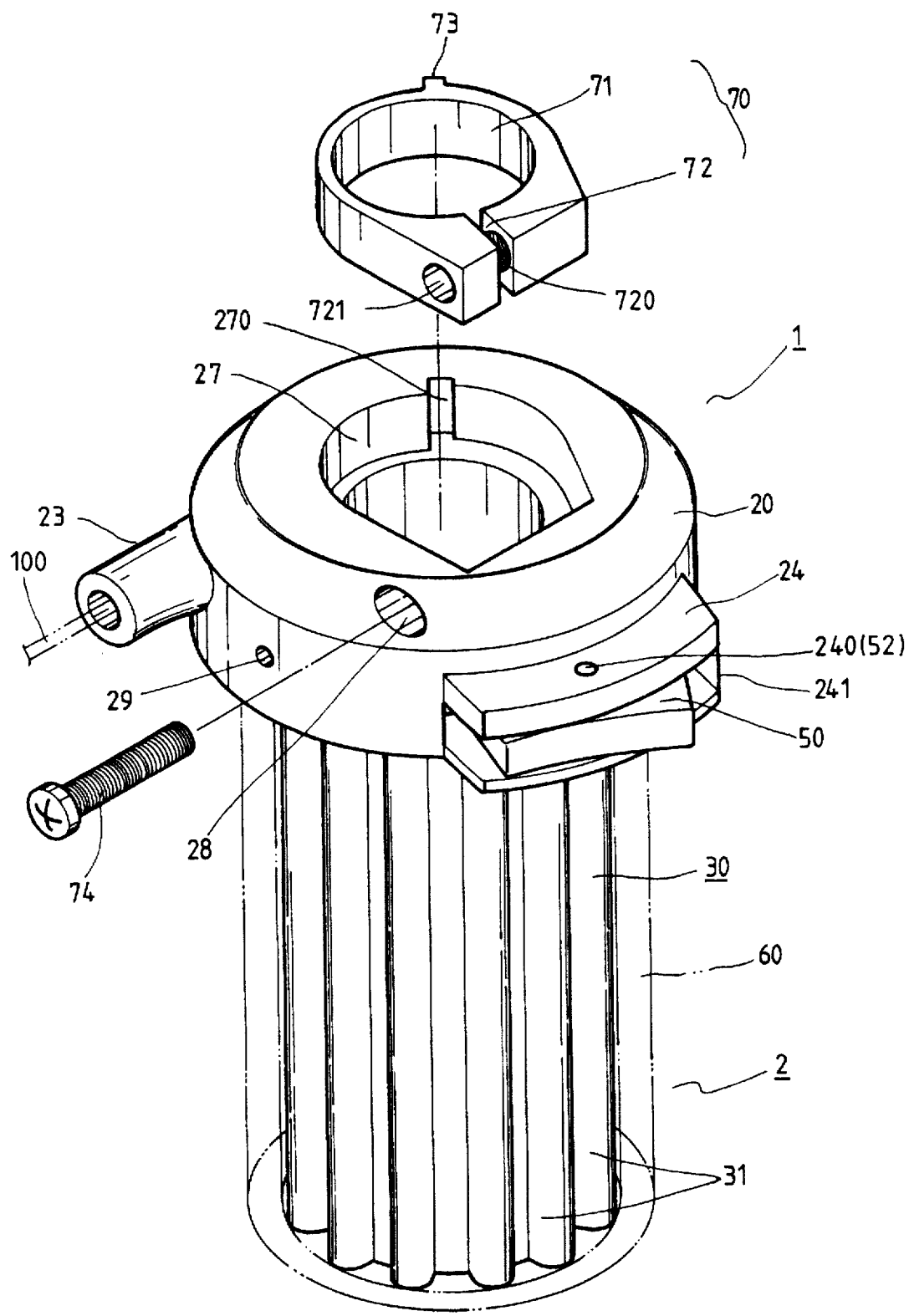
FIG. 1 is a perspective view of a gearshift adjusting device of a preferred embodiment in accordance with the invention.
Figure 2:
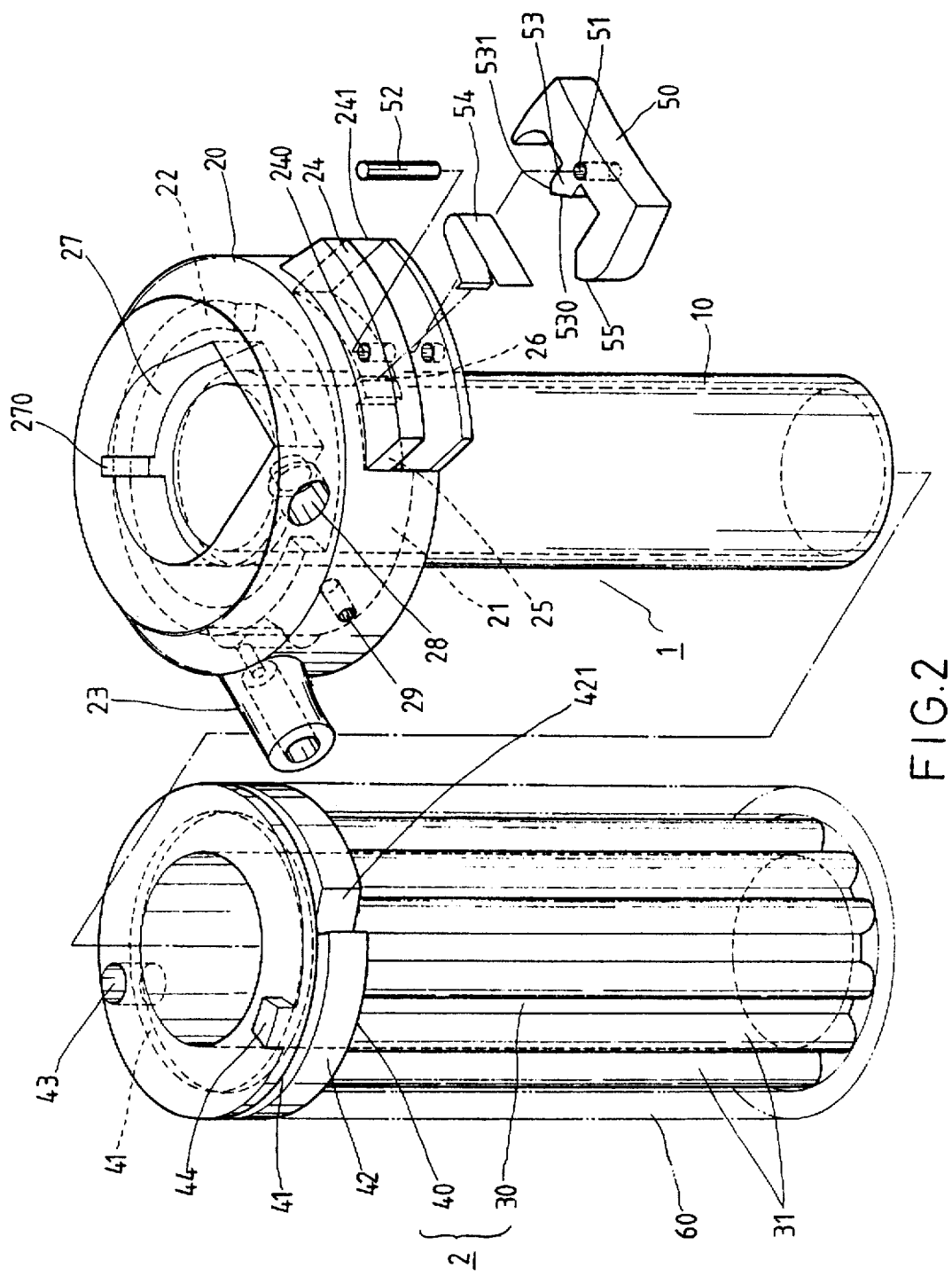
FIG. 2 is a perspective exploded view of FIG. 1.
Figure 3:
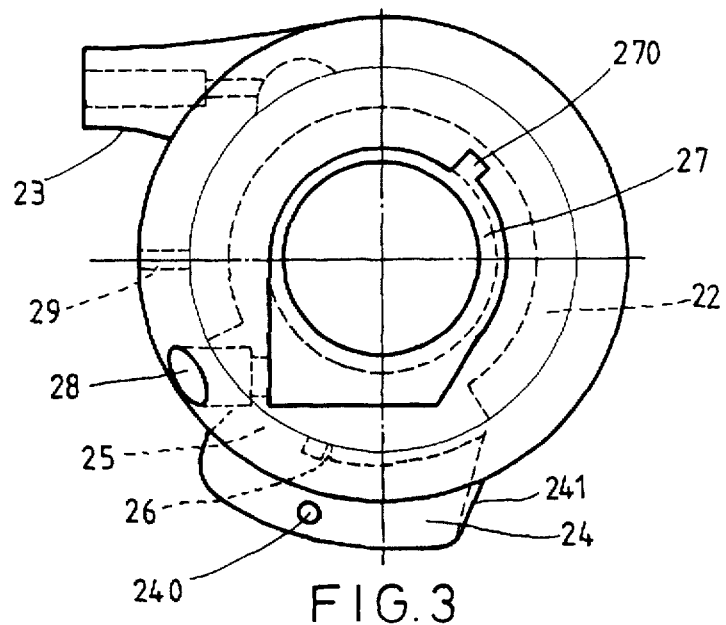
FIG. 3 is a top plan view of a first hollow sleeve.
Figure 4:
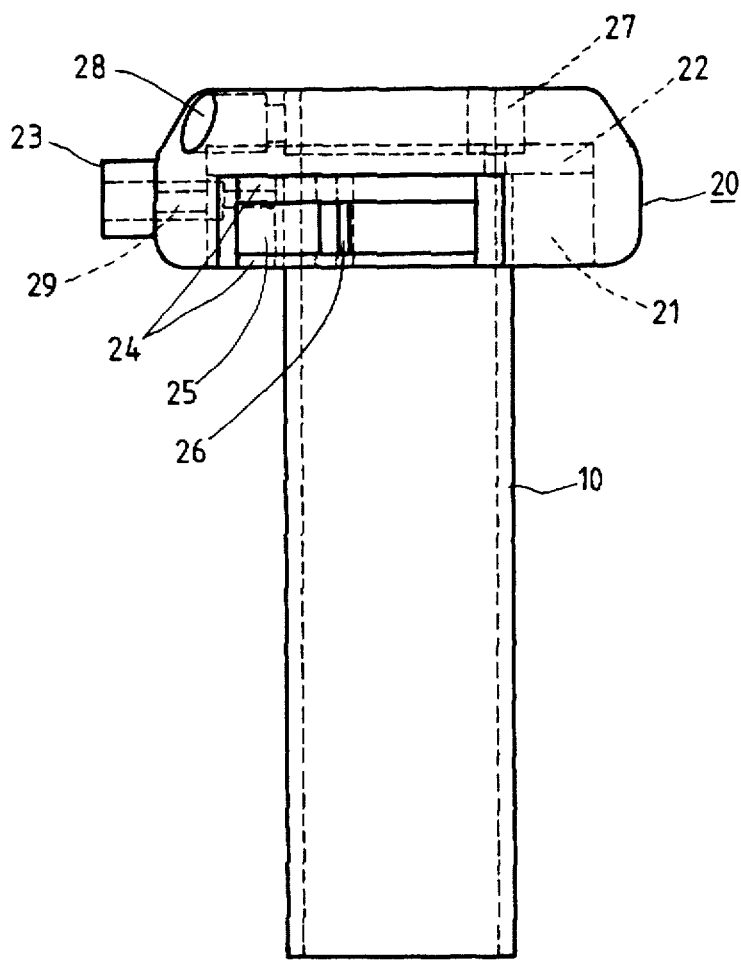
FIG. 4 is an elevational view of a first hollow sleeve.
Figure 5:
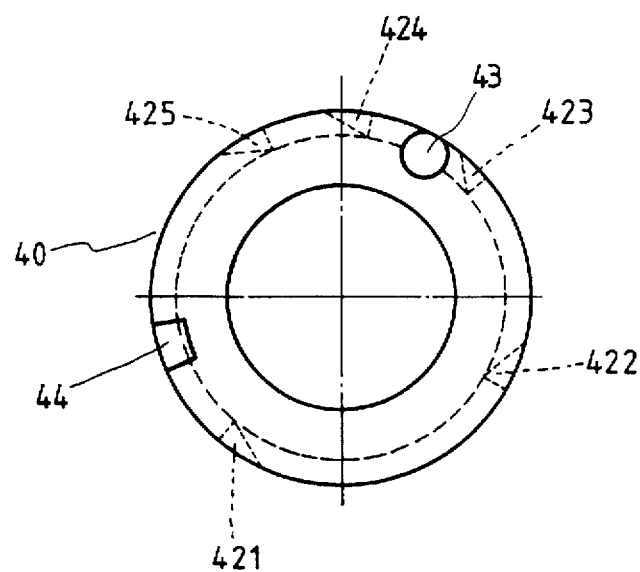
FIG. 5 is a top plan view of a second hollow sleeve.
Figure 6:
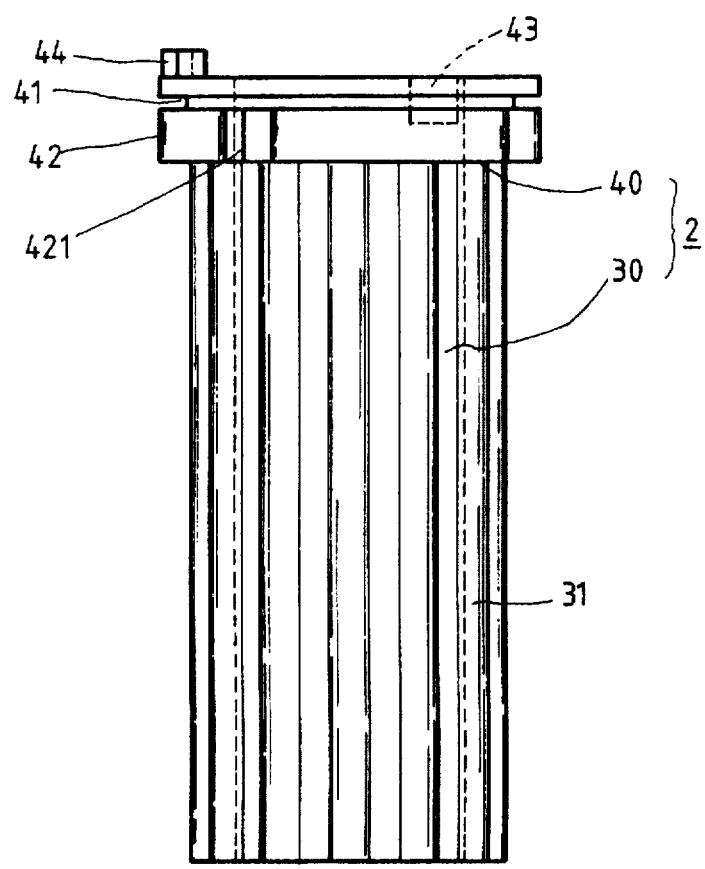
FIG. 6 is an elevational view of a second hollow sleeve.

Referring to FIGS. 1 to 6, a gearshift adjusting device comprises a first hollow sleeve 1, a second hollow sleeve 2 coupling with the first hollow sleeve 1, and a retaining ring 70 disposed in an upper portion of the first hollow sleeve 1. The retaining ring 70 has a center hole 71, a slot 72, a first round hole 720, a second round hole 721, and a positioning bar 73. The first hollow sleeve 1 has an inner pipe 10 and a hollow disk seat 20 disposed on the inner pipe 10. The hollow disk seat 20 has an opening 27 to receive the retaining ring 70, a positioning recess 270 on an inner periphery 21 of the hollow disk seat 20, a cage groove 22 on the inner periphery 21 of the hollow disk seat 20, a threaded hole 28 on the hollow disk seat 20, a water outlet 29 on the hollow disk seat 20, a tube 23 disposed on the hollow disk seat 20, and a hollow positioning plate 24 disposed on the hollow disk seat 20. The hollow positioning plate 24 has a separating plate 241 and a through hole 240. A cage seat 50 is inserted in the hollow positioning plate 24. A U-shaped elastic plate 54 is disposed between the cage seat 50 and the hollow positioning plate 24. The cage seat 50 has an inserted hole 51, a cage block 53, and a first and second arms 55. The cage block 53 has a first bevel 530 and a second bevel 531. A pin 52 passes through the through hole 240 and the inserted hole 51 to fasten the cage seat 50 and the hollow positioning plate 24 together. A notch 25 and an inserted groove 26 are formed on the hollow disk seat 20. The inserted groove 26 receives a portion of the U-shaped elastic plate 54. The second hollow sleeve 2 has an outer pipe 30 and an annular ring 40 disposed on the outer pipe 30. A plurality of protruded bars 31 are disposed on an outer periphery of the outer pipe 30. An outer casing 60 encloses the outer pipe 30. The annular ring 40 has a periphery groove 41, a ratchet wheel 42, a cage recess 43, and a protruded block 44. The ratchet wheel 42 has a plurality of ratchets 421, 422, 423, 424, and 425. The cage recess 43 communicates with the periphery groove 41. A cable 100 has an end 101 inserted in the cage recess 43. The cable 100 passes through the periphery groove 41 and the tube 23. The inner pipe 10 is inserted in the outer pipe 30. The hollow disk seat 20 encloses the annular ring 40. The protruded block 44 is inserted in the cage groove 22. The first hollow sleeve 1 is connected to a handle of an exercise bike (not shown in the figures).

Figure 10:
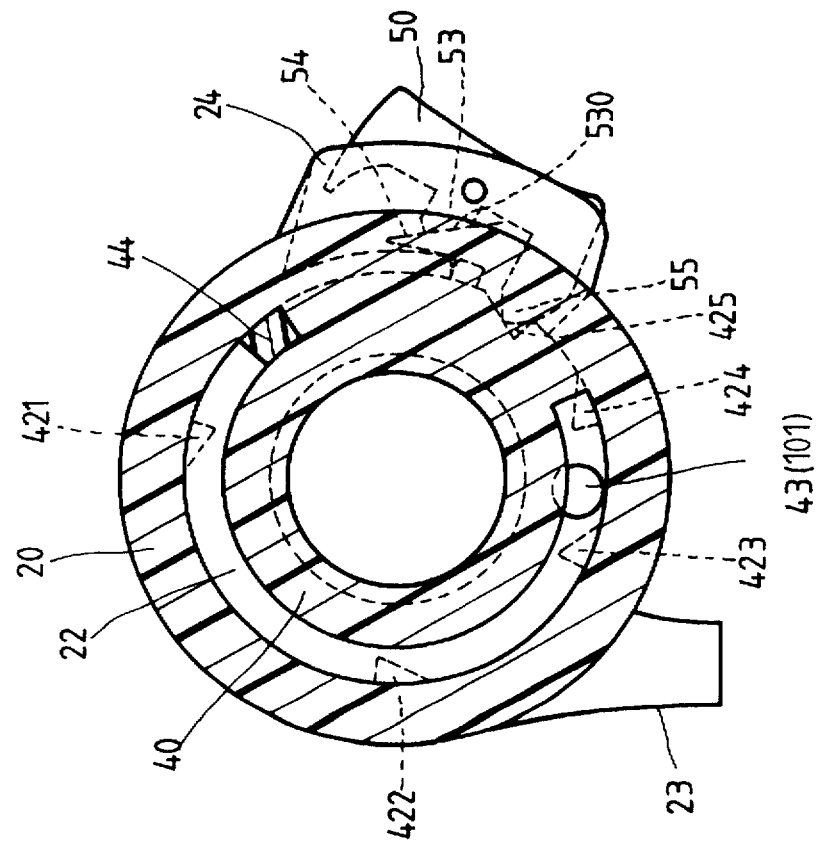
Figure 9:
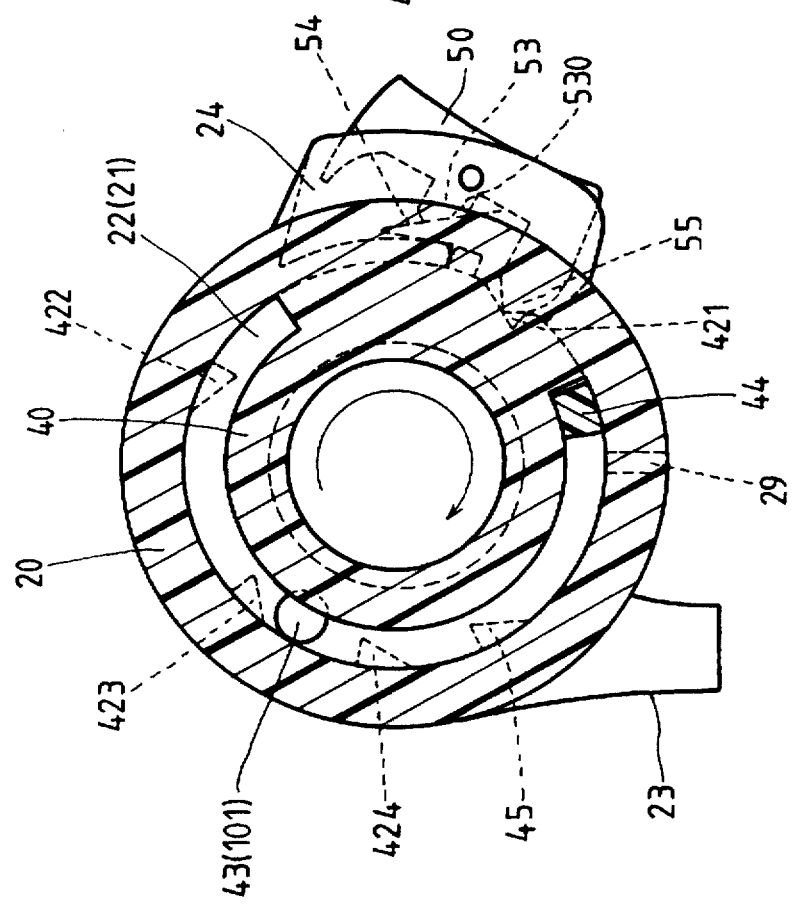
Figure 11:
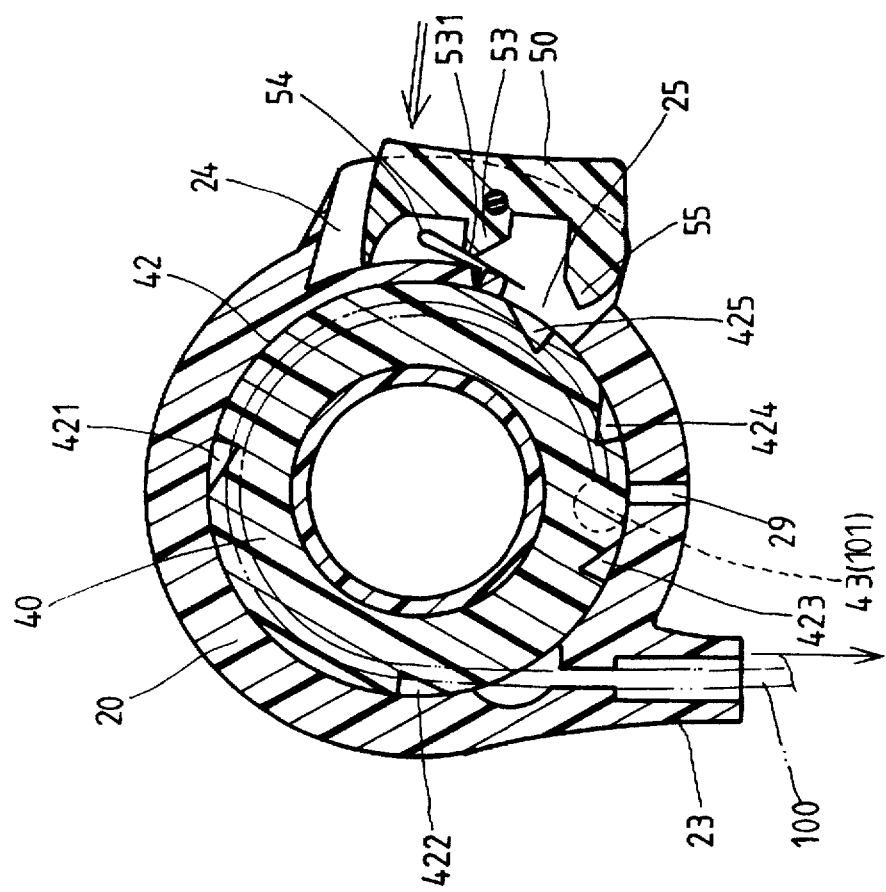

Referring to FIGS. 7 to 11, a left portion of the cage seat 50 is pressed toward the hollow disk seat 20. The U-shaped elastic plate 54 contacts the first bevel 530. The first arm 55 is inserted in the notch 25.

When the right portion of the cage seat 50 is pressed toward the hollow disk seat 20, the U-shaped elastic plate 54 contacts the second bevel 531. The first arm 55 is released from the notch 25.

Therefore, the present invention provides a gearshift adjusting device for an exercise bike which is easily operated.

The invention is not limited to the above embodiment but various modification thereof may be made. Further, various changes in form and detail may be made without departing from the scope of the invention.

I claim:

1. A gearshift adjusting device comprising:

a first hollow sleeve, a second hollow sleeve coupling with the first hollow sleeve, and a retaining ring disposed in an upper portion of the first hollow sleeve, the retaining ring having a center hole, a slot, a first round hole, a second round hole, and a positioning bar, the first hollow sleeve having an inner pipe and a hollow disk seat disposed on the inner pipe, the hollow disk seat having an opening to receive the retaining ring, a positioning recess on an inner periphery of the hollow disk seat, a cage groove on the inner periphery of the hollow disk seat, a threaded hole on the hollow disk seat, a water outlet on the hollow disk seat, a tube disposed on the hollow disk seat, and a hollow positioning plate disposed on the hollow disk seat, the hollow positioning plate having a separating plate and a through hole, a cage seat inserted in the hollow positioning plate, a U-shaped elastic plate disposed between the cage seat and the hollow positioning plate, the cage seat having an inserted hole, a cage block, and a first and second arms, a pin passing through the through hole and the inserted hole to fasten the cage seat and the hollow positioning plate together, a notch and an inserted groove formed on the hollow disk seat, the inserted groove receiving a portion of the U-shaped elastic plate, the second hollow sleeve having an outer pipe and an annular ring disposed on the outer pipe, a plurality of protruded bars disposed on an outer periphery of the outer pipe, an outer casing enclosing the outer pipe, the annular ring having a periphery groove, a ratchet wheel, a cage recess, and a protruded block, the ratchet wheel having a plurality of ratchets, the cage recess communicating with the periphery groove, the inner pipe inserted in the outer pipe, the hollow disk seat enclosing the annular ring, and the protruded block inserted in the cage groove.

2. A gearshift adjusting device as claimed in claim 1, wherein the cage block has a first bevel and a second bevel.

3. A gearshift adjusting device as claimed in claim 1, wherein a cable has an end inserted in the cage recess and the cable passes through the periphery groove and the tube.

\* \* \* \* \*